US012585269B2

(12) United States Patent
Salter et al.

(10) Patent No.: US 12,585,269 B2
(45) Date of Patent: Mar. 24, 2026

(54) FLEET MIGRATION MANAGEMENT SYSTEMS AND METHODS

(71) Applicant: Ford Global Technologies, LLC, Dearborn, MI (US)

(72) Inventors: Stuart C. Salter, White Lake, MI (US); Sanjay Dayal, Saratoga, MI (US); Pietro Buttolo, Dearborn Heights, MI (US); Ryan O'Gorman, Beverly Hills, MI (US); Brendan Diamond, Grosse Pointe, MI (US); Peter Phung, Windsor (CA)

( * ) Notice: Subject to any disclaimer, the term of this patent is extended or adjusted under 35 U.S.C. 154(b) by 363 days.

(21) Appl. No.: 18/333,546

(22) Filed: Jun. 13, 2023

(65) Prior Publication Data

US 2024/0419166 A1     Dec. 19, 2024

(51) Int. Cl.
*G05D 1/00* (2024.01)

(52) U.S. Cl.
CPC ......... *G05D 1/0027* (2013.01); *G05D 1/0022* (2013.01)

(58) Field of Classification Search
CPC ...... G05D 1/0027; G05D 1/0022; G05D 1/00; G05D 2103/00; G06Q 30/0645; G06Q 50/26; G06Q 50/40; G06Q 50/43; G06Q 50/47; G06Q 50/50; G06Q 10/20; G06Q 10/04; G06Q 10/063; G06Q 10/083; H04L 12/14; H04M 3/00; H04M 15/00; H04M 17/00; H04W 4/24
See application file for complete search history.

(56) References Cited

U.S. PATENT DOCUMENTS

| | | | |
|---|---|---|---|
| 9,076,276 B1 * | 7/2015 | Kator | G06Q 10/087 |
| 10,331,124 B2 * | 6/2019 | Ferguson | G06V 20/582 |

(Continued)

OTHER PUBLICATIONS

Priya Singh et al., Smart Fleet Management System Using IOT, Computer Vision, Cloud Computing and Machine Learning Technologies, IEEE 2019 5th International Conference for Convergence in Technology, Mar. 29-31, 2019, pp. 1-8.

(Continued)

*Primary Examiner* — Navid Z. Mehdizadeh
*Assistant Examiner* — Jared C Bean
(74) *Attorney, Agent, or Firm* — Emily Campbell; Eversheds Sutherland (US) LLP

(57)     ABSTRACT

A fleet management system is disclosed. The system may include a transceiver configured to receive vehicle information from each vehicle of a vehicle fleet and environmental condition information associated with each vehicle. The fleet management system may further include a processor configured to obtain the vehicle information and the environmental condition information, and predict a future vehicle efficiency and a future vehicle health of each vehicle. Based on the prediction, the processor may calculate first resources required to operate the vehicle fleet according to a current fleet allocation. The processor may determine an updated fleet allocation for the vehicle fleet, and calculate second resources required to operate the vehicle fleet according to the updated fleet allocation. The processor may transmit an instruction to at least vehicle of the vehicle fleet to re-locate based on the updated fleet allocation when the second resources may be less than the first resources.

16 Claims, 4 Drawing Sheets

(56)                    References Cited

U.S. PATENT DOCUMENTS

| | | | |
|---|---|---|---|
| 10,762,447 B2 * | 9/2020 | Kislovskiy ............. | G06Q 10/02 |
| 12,033,106 B2 * | 7/2024 | Klingemann .......... | G06Q 10/08 |
| 12,346,850 B1 * | 7/2025 | Bhatnager ........ | G06Q 10/06311 |
| 2019/0196503 A1 * | 6/2019 | Abari ..................... | G01C 21/34 |
| 2020/0257312 A1 * | 8/2020 | Suzuki ..................... | G08G 1/22 |
| 2021/0163021 A1 * | 6/2021 | Frazzoli ................. | H04W 4/48 |
| 2021/0182997 A1 * | 6/2021 | Klingemann .... | G06Q 10/06315 |
| 2023/0324188 A1 * | 10/2023 | Tam ................... | G01C 21/3407 |
| | | | 701/400 |
| 2024/0183675 A1 * | 6/2024 | Pankov ............. | G01C 21/3453 |

OTHER PUBLICATIONS

Maria Pia Fanti et al., Electric Vehicle Fleet Relocation Management for Sharing Systems Based on Incentive Mechanism, Dec. 1, 2020, pp. 1-7.

* cited by examiner

FLEET MIGRATION MANAGEMENT SYSTEMS AND METHODS

TECHNICAL FIELD

The present disclosure relates to fleet migration management systems and methods and more particularly to systems and methods for facilitating fleet migration management based on environmental conditions and vehicle information associated with each vehicle of a vehicle fleet (or sub-fleet).

BACKGROUND

Many commercial fleet firms have vehicle fleet distributed across distant geographical locations. Some vehicles of the vehicle fleet may be exposed to extreme weather conditions such as extreme cold or hot temperatures. Similarly, some vehicles may be exposed to unpaved or poorly maintained roads (e.g., in remote rural areas). Such exposure may cause some vehicles to age prematurely, which may affect expected residual value, leasing fees, and other fleet company metrics. Thus, the commercial fleet firms actively monitor and manage their fleet vehicles to minimize operational expenses.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
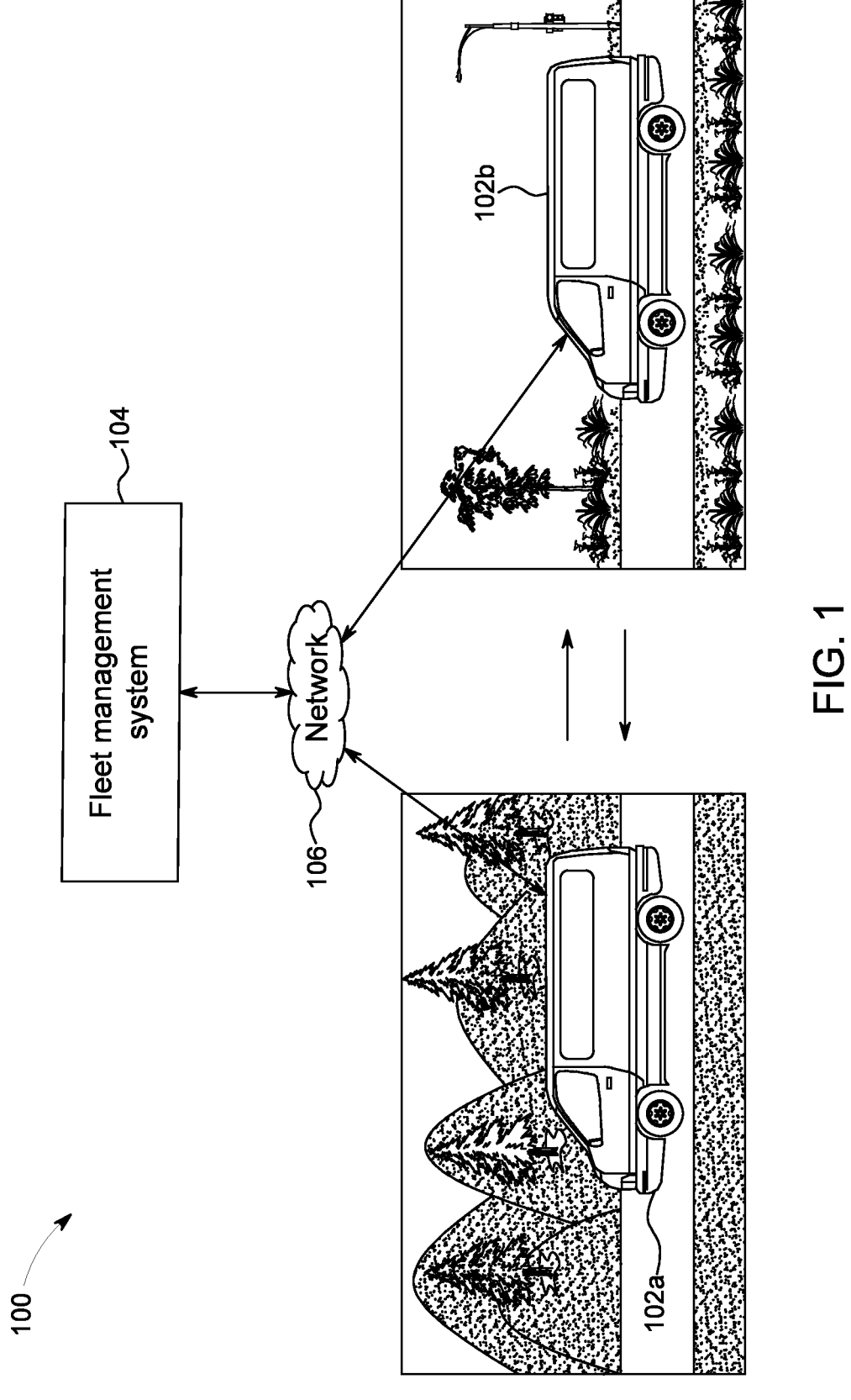
FIG. 1 depicts an example system in which techniques and structures for providing the systems and methods disclosed herein may be implemented.

The present disclosure describes vehicle fleet management systems and methods. The system may be configured to monitor vehicle performance and vehicle health of each vehicle in a vehicle fleet and environmental conditions of each geographical location/region in which the vehicles may be distributed and perform re-allocation of one or more vehicles to optimize overall fleet operation. For example, the system may obtain current fleet allocation (e.g., allocated geographical location of each vehicle), calculate future resources required to operate the vehicle fleet according to the current fleet allocation, and may determine an updated fleet allocation to reduce the future resources required to operate the vehicle fleet.

In some aspects, the system may obtain vehicle information (e.g., vehicle efficiency and the vehicle health) and environmental condition information at a first timestamp (e.g., at an end of a first weather season). The system may predict future vehicle efficiency and future vehicle health according to the current fleet allocation based on the vehicle information and the environmental condition information. Stated another way, the system may predict the future vehicle efficiency and the future vehicle health at a second timestamp (e.g., in a second weather season of the same geographical location in which the vehicles may be currently allocated). The system may predict the future resources required to operate the vehicle fleet according to the current fleet allocation based on the future vehicle efficiency and the future vehicle health. The system may further determine an updated fleet allocation to reduce the future resources. Responsive to determining the updated fleet allocation, the system may transmit instructions to one or more vehicles to relocate (e.g., autonomously) based on the updated fleet allocation.

In some aspects, the system may provide recommendations to replace vehicle components instead of or in addition to relocating vehicles from one location to another. For example, the system may provide a recommendation to replace vehicle tires or vehicle battery (when the battery/tire health may be poor) if the resources required to relocate a vehicle exceeds a threshold value.

The present disclosure discloses a fleet management system that optimizes resources or expenses required to operate the vehicle fleet. The system may predict vehicle performance and health of each vehicle based on environmental conditions (e.g., temperature, road conditions, etc.) of geographical locations in which the vehicles may be located, and relocate the vehicles to minimize the effect of environmental conditions on specific vehicles. The system may further transmit instructions and automatically relocate the vehicles from one location to another, thus minimizing manual effort in vehicle relocation.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example system 100 in which techniques and structures for providing the systems and methods disclosed herein may be implemented. The system 100 may include a plurality of vehicles 102*a*, 102*b* (collectively referred to as plurality of vehicles 102) and a fleet management system 104 (or system 104) that may be connected with each other via a network 106.

The plurality of vehicles 102 may take the form of any commercial vehicle such as, for example, an off-road vehicle, a car, a crossover vehicle, a van, a minivan, a bus, a truck, etc. Further, the plurality of vehicles 102 may include any powertrain such as, for example, a gasoline engine, one or more electrically-actuated motor(s), a hybrid system, etc. Furthermore, the plurality of vehicles 102 may be configured and/or programmed to operate in a fully autonomous (e.g., driverless) mode (e.g., Level-5 autonomy) or in one or more partial autonomy modes which may include driver assist technologies.

The network(s) 106 illustrates an example communication infrastructure in which the connected devices discussed in various embodiments of this disclosure may communicate. The network(s) 106 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the system 104 may be associated with a vehicle fleet firm/operator that may manage/operate the plurality of vehicles 102. The plurality of vehicles 102 may be distributed or located across a plurality of geographical locations or regions according to a fleet allocation distribution plan (or a "current fleet allocation") that may be devised by the vehicle fleet firm/operator and may be pre-stored in a system memory. In some aspects, such geographical locations may be spread across a large geographical area (e.g., across different cities or states of a country) and may have different environmental and road conditions. For example, the vehicle 102a may be located at or allocated to a location "A" where an average temperature in winter season may be 20 degrees Fahrenheit and the vehicle 102b may be allocated to a location "B" where an average temperature in winter season may be 60 degrees Fahrenheit.

Since the vehicle 102a and the vehicle 102b may be operating in different environmental conditions and on different roads, the vehicle 102a and the vehicle 102b may have different associated operational efficiencies and life expectancies. For example, the vehicle 102a allocated to the location "A" may provide lesser range than the vehicle 102b allocated to the location "B" (e.g., when the vehicles 102a, 102b may be electric vehicles), as the vehicle 102a may be required to operate in colder weather condition. As another example, if the vehicle 102a is allocated to a city (having maintained roads) and the vehicle 102b is allocated to a rural area (having poorly maintained roads), vehicle 102b life expectancy (especially vehicle tires) may be less than vehicle 102a life expectancy.

The system 104 may be configured to analyze each vehicle performance/health and respective environmental condition of geographical area/region in which the vehicle 102 may be located, and may migrate one or more or all vehicles in the vehicle fleet from one location to another to optimize overall vehicle fleet operation. For example, the system 104 may swap locations/allocations of the vehicle 102a and the vehicle 102b to optimize the vehicle fleet operation, as shown in FIG. 1.

Specifically, the system 104 may be configured to obtain vehicle information associated with each vehicle 102 at a predefined frequency or after a particular time duration. For example, the system 104 may obtain the vehicle information associated with each vehicle 102 at an end of a first weather season (e.g., winter season). The vehicle information may include information associated with vehicle efficiency (e.g., expense per mileage), vehicle component health condition (e.g., a battery health condition, a tire health condition, etc.), vehicle type, and/or the like. The system 104 may further obtain environmental condition information of respective geographical areas in which each vehicle 102 may be located. The environmental condition information may include information associated with climate temperature and road conditions. In some aspects, the environmental condition information may additionally include expected future environmental condition information (e.g., expected future weather season or second weather season).

The system 104 may be configured to predict a future vehicle efficiency and a future vehicle health of each vehicle 102 based on the obtained vehicle information and the respective environmental condition information (e.g., based on the expected future environmental condition information) according to the current fleet allocation. For example, the system 104 may analyze current vehicle efficiency and current vehicle component health condition of the vehicle 102a in the location "A", and may predict or estimate future vehicle efficiency and future vehicle health in the expected future environmental condition in the location "A".

The system 104 may be further configured to calculate or estimate first resources (or first future resources or total future expense) required to operate the vehicle fleet according to the current fleet allocation in the expected future weather season (e.g., in the second season or any future time duration). The system 104 may calculate the first resources based on the prediction of the future vehicle efficiency and the future vehicle health of each vehicle 102 in the expected future environmental condition. Responsive to calculating the first resources, the system 104 may identify an updated fleet allocation for the vehicle fleet and calculate or estimate second resources (or second future resources or an updated total expense) required to operate the vehicle fleet in the second season according to the updated fleet allocation. The system 104 may calculate the second resources based on the prediction of the future vehicle efficiency and the future vehicle health of each vehicle 102. In some aspects, the second resources may include third resources required to re-locate some or all vehicles in the vehicle fleet from the current fleet allocation to the updated fleet allocation. For example, if in the updated fleet allocation, the vehicle 102a is relocated from the location "A" to the location "B", the third resources may be indicative of resources required to move the vehicle 102a from the location "A" to the location "B".

The system 104 may transmit an instruction to the some or all vehicles in the vehicle fleet to relocate based on the updated fleet allocation when the second resources may be less than the first resources. The vehicles (e.g., autonomous vehicles), which may be instructed to relocate, may receive the instruction and move to another location according to the updated fleet allocation.

In additional aspects, the system 104 may be configured to provide recommendation to replace a vehicle component based on the predicted future vehicle health and the third resources required to re-locate the vehicle 102. For example, when the system 104 determines that the third resources (expenses) to swap the vehicle 102a (allocated to the city) and the vehicle 102b (allocated to the rural area having poorly maintained roads) exceeds a threshold, the system 104 may provide recommendation to replace vehicle 102b tires (e.g., when the third resources may be greater than resources required to replace vehicle 102b tires).

The vehicle 102, a vehicle operator, and the system 104 may implement and/or perform operations, as described herein in the present disclosure, in accordance with the owner manual and safety guidelines.

Further details of the system 104 are described below in conjunction with FIG. 2.

Figure 2:
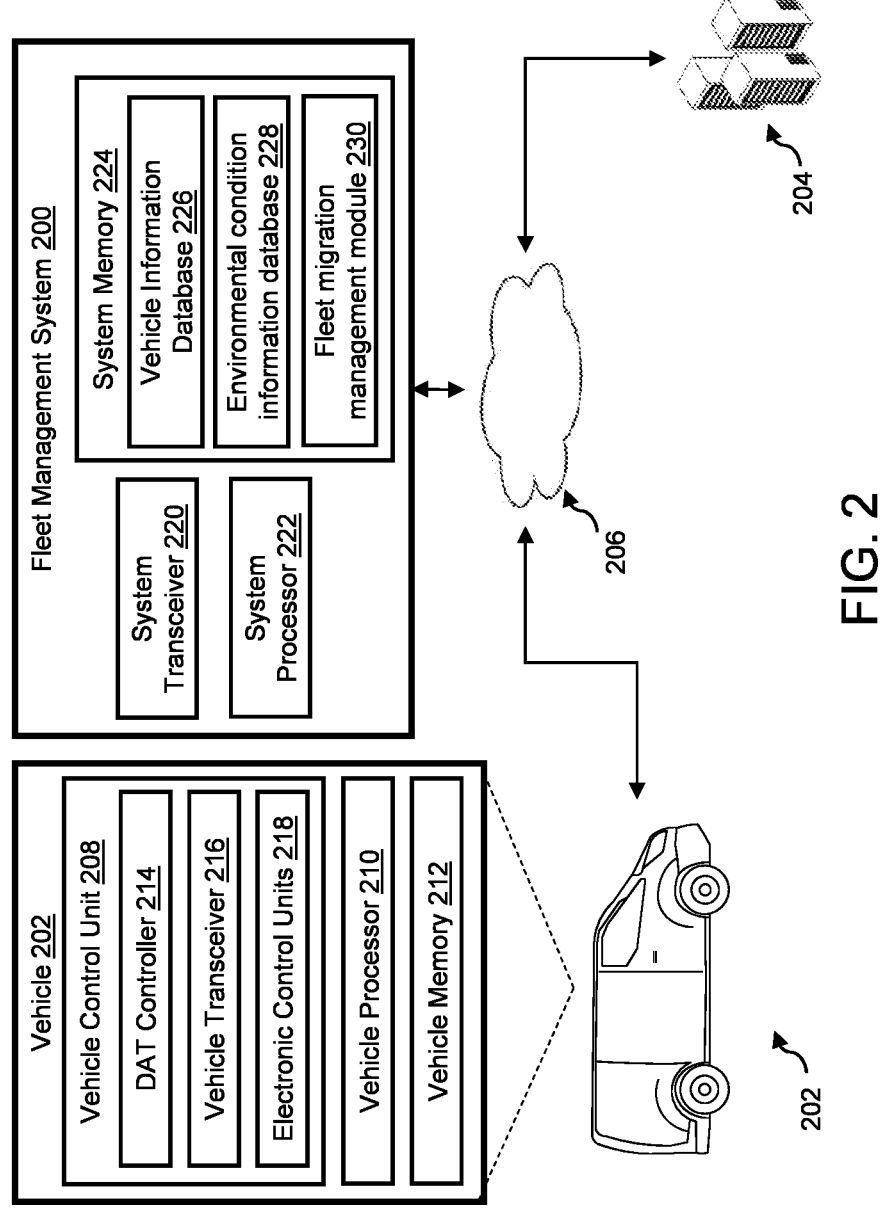
FIG. 2 depicts an example fleet management system in accordance with the present disclosure.

FIG. 2 depicts an example fleet management system 200 in accordance with the present disclosure. The fleet management system 200 may be same as the fleet management system 104. The fleet management system 200, as described herein, can be implemented in hardware, software (e.g., firmware), or a combination thereof.

The fleet management system 200 may be connected with a plurality of vehicles 202 (shown as a single vehicle 202 in FIG. 2) of a vehicle fleet, and a fleet computing device 204, via a network 206. The plurality of vehicles 202 and the fleet computing device 204 may be further connected with each other via the network 206. The network 206 may be same as the network 106. In some aspects, the fleet management system 200 may be part of the fleet computing device 204. In other aspects, the fleet management system 200 may be separate from the fleet computing device 204 (as shown in FIG. 2).

The plurality of vehicles 202 may be same as the plurality of vehicles 102, and may form the vehicle fleet. In some aspects, movement, storage, usage, etc. of each vehicle 202 may be controlled and/or managed by individual vehicle operators (not shown) and/or a fleet operator (not shown) using the fleet management system 200. In some aspects, the fleet operator may use the fleet computing device 204 to store the vehicle information and the environmental condition information described in conjunction with FIG. 1.

In some aspects, the vehicle 202 may be programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

The vehicle 202 may include a plurality of units including, but not limited to, a vehicle control unit (VCU) 208, one or more vehicle processors 210 (or a vehicle processor 210) and a vehicle memory 212 (that may be part of an on-board vehicle computer, not shown), communicatively connected with each other. The VCU 208 may include a plurality of units including, but not limited to, a Driver Assistance Technologies (DAT) controller 214, a vehicle transceiver 216, a plurality of electronic control units (ECUs) 218, and/or the like. In some aspects, the vehicle transceiver 216 may be outside the VCU 208. The VCU 208 may be configured and/or programmed to coordinate data within vehicle units, connected computing devices (e.g., the fleet computing device 204), other vehicles (not shown in FIG. 2) operating as part of the vehicle fleet and the fleet management system 200.

The DAT controller 214 may provide Level-1 through Level-4 automated driving and driver assistance functionality to a vehicle 202 operator. One or more ECUs 218 may be configured to determine vehicle operational status (or the vehicle information) including, but not limited to, a vehicle battery health status, a vehicle tire health status, a vehicle efficiency (e.g., expense per mileage), a vehicle range, and/or the like. In some aspects, the ECUs 218 may be additionally configured to determine the environmental condition information, for example, an average climate temperature/season or road condition associated with a location in which the vehicle 202 may be operating, and an expected future climate temperature/season in the location. For example, the ECUs 218 may determine upcoming season (winters or summers or expected temperature) in which the vehicle 202 may operate based on the current season in the location in which the vehicle 202 may be located.

The battery health status may include information associated with a current vehicle battery discharge rate, battery degradation over time, and/or the like. Similarly, the vehicle tire health status may include information associated with tire degradation over time.

The vehicle processor 210 may be disposed in communication with one or more memory devices (e.g., the vehicle memory 212 and/or one or more external databases not shown in FIG. 2). The vehicle processor 210 may utilize the vehicle memory 212 to store programs in code and/or to store data for performing various vehicle 202 operations in accordance with the present disclosure. The vehicle memory 212 may be a non-transitory computer-readable memory. The vehicle memory 212 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the vehicle memory 212 may store the vehicle information determined by the ECUs 218. In some aspects, the VCU 210/ECUs 218 may send the vehicle information to the vehicle memory 212 for storage purpose at a predefined frequency or at an end of each weather season. In further aspects, the vehicle memory 212 may store the environmental condition information (including the expected future environmental condition) determined by the ECUs 218.

In additional aspects, the vehicle memory 212 may store information associated vehicle type, vehicle model, vehicle year of manufacture, vehicle battery type (along with other vehicle component type), vehicle battery year of manufacture, and/or the like, as a part of the vehicle information.

The vehicle transceiver 216 may be configured to obtain the vehicle information and/or the environmental condition information from the vehicle memory 212, and transmit the information to one or more external systems or servers. For example, the vehicle transceiver 216 may transmit the information to the fleet computing device 204 and/or the fleet management system 200 via the network 206 at the predefined frequency or at the end of each weather season.

A person ordinarily skilled in the art may appreciate that the vehicle architecture shown in FIG. 2 may omit certain vehicle units and/or vehicle computing modules. It should be readily understood that the vehicle 202 depicted in FIG. 2 is an example of a possible implementation according to the present disclosure, and thus, it should not be considered limiting or exclusive.

Further, although the description above describes that the vehicle transceiver 216 may obtain the vehicle information and the environmental condition information from the vehicle memory 212 and transmit the information to one or more external systems (e.g., the fleet management system 200), a person ordinarily skilled in the art may appreciate that some parts of the vehicle information and the environmental condition information may be obtained from other systems, different from the vehicle 202. For example, the fleet management system 200 may obtain the environmental condition information from the fleet computing device 204 and/or external servers (not shown).

The fleet management system 200 may receive the vehicle information and/or the environmental condition information from the vehicle transceiver 216 and/or the fleet computing device 204. The fleet management system 200 may include a plurality of units including, but not limited to, a system transceiver 220, one or more system processors 222 (or a system processor 222) and a system memory 224. The system transceiver 220 may be configured to transmit and receive information, data, notifications, instructions, etc. to and from the vehicle 202, the fleet computing device 204, and other external devices via the network 206. For example, the system transceiver 220 may be configured to receive the vehicle information from the vehicle transceiver 216 and/or the fleet computing device 204 at an end of a first weather season (e.g., winter season) associated with a first geographical area in which the vehicle 202 may be located according to the current fleet allocation. The system transceiver 220 may be further configured to receive the environmental condition information associated with the first geographical area from the vehicle transceiver 216 and/or the fleet computing device 204 at an end of the first weather season. As described above, the environmental condition information may include expected future environmental condition. For example, the system transceiver 220 may receive information associated with a second weather season (e.g., summer season, which may be a future season after the winter season) from the vehicle transceiver 216 and/or the fleet computing device 204. The information associated with the second weather season may include, for example, an expected future average temperature in the summer season in the first geographical area in which the vehicle 202 may be located.

Although the description above describes an aspect where the system transceiver 220 receives the vehicle information and the environmental condition information from the vehicle 202, a person ordinarily skilled in the art may appreciate that the system transceiver 220 receives such associated vehicle information and environmental condition information from each vehicle in the vehicle fleet.

The system processor 222 may be disposed in communication with one or more memory devices, e.g., the system memory 224 and/or one or more external databases (not shown in FIG. 2). The system processor 222 may utilize the system memory 224 to store programs in code and/or to store data for performing various system operations in accordance with the present disclosure. The system memory 224 may be a non-transitory computer-readable memory storing a fleet management program code. The system memory 224 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the system memory 224 may include a plurality of modules and databases including, but not limited to, a vehicle information database 226, an environmental condition information database 228 and a fleet migration management module 230. The fleet migration management module 230, as described herein, may be stored in the form of computer-executable instructions, and the system processor 222 may be configured and/or programmed to execute the stored computer-executable instructions for performing fleet management system functions in accordance with the present disclosure.

The vehicle information database 226 may store the vehicle information that the system transceiver 220 may receive from each vehicle (e.g., from the vehicle transceiver 216). Specifically, responsive to receiving the vehicle information, the system transceiver 220 may send the vehicle information to the vehicle information database 226 for storage purpose. Similarly, the environmental condition information database 228 may store the environmental condition information associated with each vehicle 202 that the system transceiver 220 may receive from the vehicle transceiver 216 and/or the fleet computing device 204.

In operation, the system processor 222 may be configured to obtain the vehicle information from the vehicle information database 226 and/or from the system transceiver 220 for each vehicle 202 in the vehicle fleet. The system processor 222 may obtain the vehicle information at a first weather season end (or any other specific time duration). The system processor 222 may obtain the environmental condition information, associated with respective geographical area in which each vehicle 202 may be allocated, from the environmental condition information database 228 and/or the system transceiver 220. In some aspects, the system processor 222 may estimate the expected future environmental condition information based on the current environmental condition information stored in the environmental condition information database 228, and may not receive/obtain the expected future environment condition information from the vehicle transceiver 216. The system processor 222 may store the expected future environmental condition information in the environmental condition information database 228 as a part of the environmental condition information.

Responsive to obtaining the vehicle information and the environment condition information, the system processor 222 may be configured to predict a future vehicle efficiency and a future vehicle health for each vehicle 202 in the second weather season or upcoming weather season (or any future time duration) according to the current fleet allocation. Specifically, the system processor 222 may analyze the vehicle information (i.e., current vehicle efficiency/health condition) and may then estimate future vehicle efficiency/health condition, for example, in the second weather season. For example, the system processor 222 may analyze the vehicle efficiency (e.g., historical efficiency for past 6 months/one season) and vehicle health information (e.g., battery and tire degradation information) of the vehicle 202 in the location "A", and estimate future vehicle efficiency and the future health condition in the location "A".

As an example, for an electric vehicle (e.g., the vehicle 202), the system processor 222 may predict the future vehicle efficiency (or expense per mileage) based on a function of battery kilo watt hour, expense kilo watt hour, and vehicle range (based on expected future environmental condition such as climate temperature and road conditions), as illustrated in the expression below.

$$ExpensePerMile = \frac{BatterykWH * ExpensekWH}{\text{Range}(Temp, \text{Road})}$$

Further, the system processor 222 may predict the battery health as a function of expected environmental condition (e.g., climate temperature) and current battery throughput, as illustrated in the expression below.

$$BatteryWear = f(Temp, \text{Current } Throughput)$$

Similarly, the system processor 222 may predict the tire health as a function of expected environmental condition (e.g., road conditions and climate temperature) as illustrated in the expression appended below. For example, if the vehicle 202 is operating in a rural area where the vehicle 202 may be required to traverse on poorly maintained roads, the system processor 222 may predict that the vehicle tire may have less life expectancy.

$$TireWear = f(Temp, \text{Road})$$

In further aspects, the system processor 222 may be configured to calculate resources (e.g., "first resources") required to operate the vehicle fleet (i.e., the plurality of vehicles 202) according to the current fleet allocation. In this case, the system processor 222 may calculate total expense required to operate the vehicle fleet according to the current fleet allocation. In some aspects, the system processor 222 may calculate the first resources based on the prediction of the future vehicle efficiency and the future vehicle health, as described above.

In some aspects, to calculate the first resources, the system processor 222 may calculate individual vehicle operational expense according to the current fleet allocation based on the future vehicle efficiency and the future vehicle health of the vehicle (e.g., the vehicle 202). Stated another way, the system processor 222 may calculate the operational expense for each vehicle 202 in the vehicle fleet. The system processor 222 may aggregate individual vehicle operational expenses to calculate the first resources.

In additional aspects, the system processor 222 may calculate expenses to operate regional fleets (or "sub-fleets") according to the current fleet allocation. Specifically, the system processor 222 may calculate operational expense to operate a first regional fleet, a second regional fleet, and so on. The system processor 222 may calculate the first resources as a function of operational expenses required to operate the first regional fleet, the second regional fleet etc., as illustrated in the expression below.

$$Expense = f(F1, F2, \ldots Fm)$$

In the expression illustrated above, F1, F2, Fm are regional fleets and m is a count of regions of geographical areas where the vehicle fleet may have associated fleet vehicles located.

In some aspects, the system processor 222 may calculate the individual vehicle operational expense by calculating respective vehicle scores according to the current fleet allocation, based on the prediction of respective future vehicle efficiency and future vehicle health (e.g., at the end of first weather season). The system processor 222 may calculate the individual vehicle score based on predefined rules or metrics defined by the fleet operator, which may be pre-stored in the system memory 224. The system processor 222 may be further configured to correlate the individual vehicle scores with an expense matrix (which may be pre-stored in the system memory 224). The expense matrix may include a mapping of vehicle scores with vehicle operational expenses. The system 200 may generate the mapping based on historical fleet information or respective vehicle historical information. In some aspects, the system 200 may obtain the mapping from an external server. Based on the correlation, the system processor 222 may determine operational expense to operate each vehicle 202 according to the current fleet allocation, for example, in the second weather season.

As described above, the system processor 222 may be configured to aggregate the individual vehicle expenses to calculate the first resources. For example, when the system processor 222 determines that a vehicle "A" may be having a vehicle score of 7 out of 10 and a vehicle "B" may be having a vehicle score 3 out of 10, the system processor 222 may determine the operational expenses to operate the vehicle "A" and the vehicle "B" by using the vehicle scores 3 and 7, and correlating the vehicle scores with the expense matrix stored in the system memory 224. In an exemplary scenario, a vehicle with a higher vehicle score (e.g., the vehicle "A") may have associated operational expenses that may be lower than operational expenses associated with a vehicle with a lower vehicle score (e.g., the vehicle "B").

In a similar manner as described above, the system processor 222 may calculate operational expenses to operate regional fleets by calculating respective regional fleet score for different regions in which the vehicle fleet (or fleet vehicles) may be located. Specifically, the system processor 222 may calculate scores of individual regions such as a first regional score, a second regional score, etc. by aggregating individual vehicle scores of vehicles that may be operating in respective regions. For example, the first regional score may include aggregation of vehicle scores associated with vehicles located in a first region, the second regional score may include aggregation of vehicle scores associated with vehicles located in a second region, and/or the like. The system processor 222 may use the expense matrix to calculate the operational expenses to operate regional fleets, in a similar manner as described above. The system processor 222 may be configured to aggregate the individual regional operational expenses to calculate the first resources.

In some aspects, responsive to calculating the first resources, the system processor 222 may determine an updated fleet allocation for the vehicle fleet (i.e., the plurality of vehicles 202) to minimize the total operational expense (the first resources) of operating the vehicle fleet. The system processor 222 may use machine learning or Artificial Intelligence (AI) technique to determine the updated fleet allocation. In an exemplary aspect, the system processor 222 may apply a neural network model (not shown) to determine the updated fleet allocation. The neural network model may be stored in the system memory 224.

In one or more aspects, the neural network model may include electronic data, which may be implemented, for example, as a software component, and may rely on code databases, libraries, scripts, or other logic or instructions for execution of a neural network algorithm by the system processor 222. The neural network model may be implemented as code and routines configured to enable a computing device, such as the fleet management system 200, to perform one or more operations. In some aspects, the neural network model may be implemented using hardware including a processor, a microprocessor, a field-programmable gate array (FPGA), or an application-specific integrated circuit (ASIC). In other aspects, the neural network model may be implemented by using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some aspects, the neural network model may include numerical computation techniques using data flow graphs. In one or more aspects, the neural network model may be based on a hybrid architecture of multiple Deep Neural Networks (DNNs).

In an exemplary aspect, the system processor 222 may use the LSTM neural network to determine the updated fleet allocation and minimize the first resources. In further aspects, the system processor 222 may use batch gradient descent algorithm to determine and/or select the updated fleet allocation. The details of such determination may be understood as follows.

The system processor 222 may obtain the current fleet allocation from the system memory 224 and/or the fleet computing device 204. The current fleet allocation may have geographical area/region allocation for different types of vehicles operating in the vehicle fleet. For example, the current fleet allocation may be described as expression:

$$\text{Fleet}_i(t) = n_{11,t}V_1 + n_{12,t}V_2 + \ldots + n_{1n,t}V_n$$

where:
n is vehicle class,
t is a time duration (e.g., time duration of a season),
V is vehicle,
i is regional or national fleet identifiers or count.

The system processor 222 may then use the batch gradient descent algorithm to update the fleet allocation or determine the updated fleet allocation. For example, the system processor 222 may alter the fleet as described in the expression below:

$$F1(+1), \ldots, Fm(+1)$$

where F is regional fleet and m is number of regions.

In an exemplary aspect, in the updated fleet allocation, one or more or all vehicles in the vehicle fleet may be relocated to different location to optimize overall vehicle fleet operational expenses (i.e., the resources). Responsive to determining the updated fleet allocation, the system processor 222 may then calculate second resources (e.g., second expenses) required to operate the vehicle fleet according to the updated fleet allocation. The system processor 222 may calculate the second resources in the same manner as the first resources, for example, based on the vehicle information and the environmental condition information. Specifically, the system processor 222 may predict future vehicle efficiency and future vehicle health in the "re-allocated regions" based on the vehicle information and expected future environmental condition in the "re-allocated regions". Based on the future vehicle efficiency and the future vehicle health in the "re-allocated regions, the system processor 222 may calculate the second resources. In some aspects, the system processor 222 may be additionally configured to calculate third resources (third expenses) required to re-locate the vehicles according to the updated fleet allocation. The third resources may be a part of the second resources.

The system processor 222 may be configured to compare the first resources (required to operate the vehicle fleet according to the current fleet allocation) with the second resources (required to operate the vehicle fleet according to the updated fleet allocation and to re-locate the vehicles). The system processor 222 may be configured to determine that the second resources may be less than the first resources based on the comparison. The system processor 222 may be configured to transmit, via the system transceiver 220, an instruction to at least one vehicle from the vehicle fleet to re-locate when the system processor 222 determines that the second resources may be less than the first resources.

In some aspects, the system processor 222 may use the batch gradient descent algorithm to iteratively update the fleet allocation until the system processor 222 determines an updated fleet allocation which may have associated second resources required to operate (and re-locate) the vehicle fleet that may be less than the first resources.

The system processor 222 may update the vehicle fleet allocation to reduce variability of vehicle scores in the vehicle fleet. For example, when the system processor 222 determines that a vehicle "A" may be having a score of 7 out of 10 (as the vehicle "A" may not be allocated to extreme weather condition) and a vehicle "B" may be having a score 3 out of 10 (as the vehicle "B" may be allocated to extreme weather condition), the system processor 222 may swap the allocation of the vehicle "A" and the vehicle "B".

In some aspects, the system processor 222 may update fleet allocation of specific vehicles or regions (such as for the first region and the second region) and may not update fleet allocation for the overall fleet based on the respective individual/regional scores. Stated another way, the system processor 222 may select a group of vehicles in the vehicle fleet for re-allocation based on the individual vehicle score or group vehicle score (e.g., regional score). In further aspects, the system processor 222 may update fleet allocation of specific vehicles or regions based on respective expenses.

Figure 3:
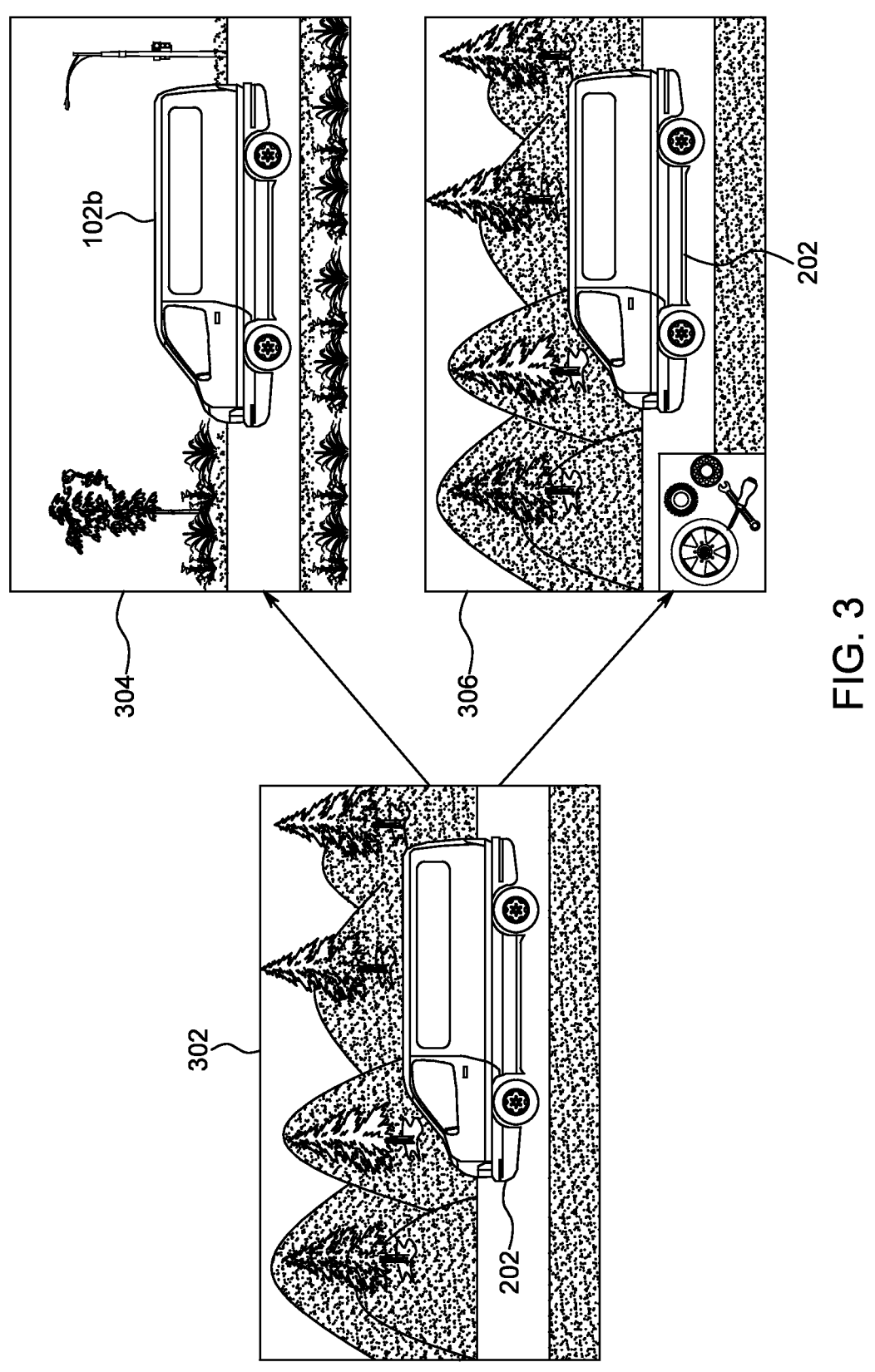
FIG. 3 depicts an exemplary embodiment to manage a vehicle allocation in accordance with the present disclosure.

FIG. 3 depicts an exemplary embodiment to manage a vehicle allocation in accordance with the present disclosure. In the aspect depicted in FIG. 3, when the vehicle 202 may be allocated to a location "A" where the expected future climate temperature may be 20 degrees Fahrenheit (in winter season, as shown in view 302) and the vehicle 202 may be an electric vehicle having four years old battery, the system processor 222 may predict that the vehicle score may reduce if the vehicle 202 continues to operate in the location "A" in the winter season. For example, the system processor 222 may determine that the vehicle efficiency/range may reduce substantially (as the vehicle 202 is the electric vehicle) and the vehicle battery may not support the winter condition. Thus, the operational expense to operate the vehicle 202 in the location "A" may increase (and may exceed a threshold value). Responsive to such determination, the system processor 222 may transmit an instruction to the vehicle 202 to automatically relocate to another location "B" where the average temperature may be 60 degrees Fahrenheit, as shown in view 304.

In other aspects, when the vehicle battery may be four years old and may not support if the vehicle 202 continues to operate in the location "A", the system processor 222 may transmit a recommendation to the vehicle 202 to replace the vehicle battery instead of moving the vehicle 202 to another location, as shown in view 306. In some aspects, the system processor 222 may recommend to replace the vehicle battery (or other vehicle components) instead of moving the vehicle 202 to another location based on the expense required to relocate the vehicle 202 to the other location.

Similarly, the system processor 222 may analyze location "A" road conditions and vehicle tire condition, and may recommend to replace the vehicle tire or transmit the instruction to relocate the vehicle 202 to another location having better road conditions based on the expense required to relocate the vehicle 202 to the other location.

Figure 4:
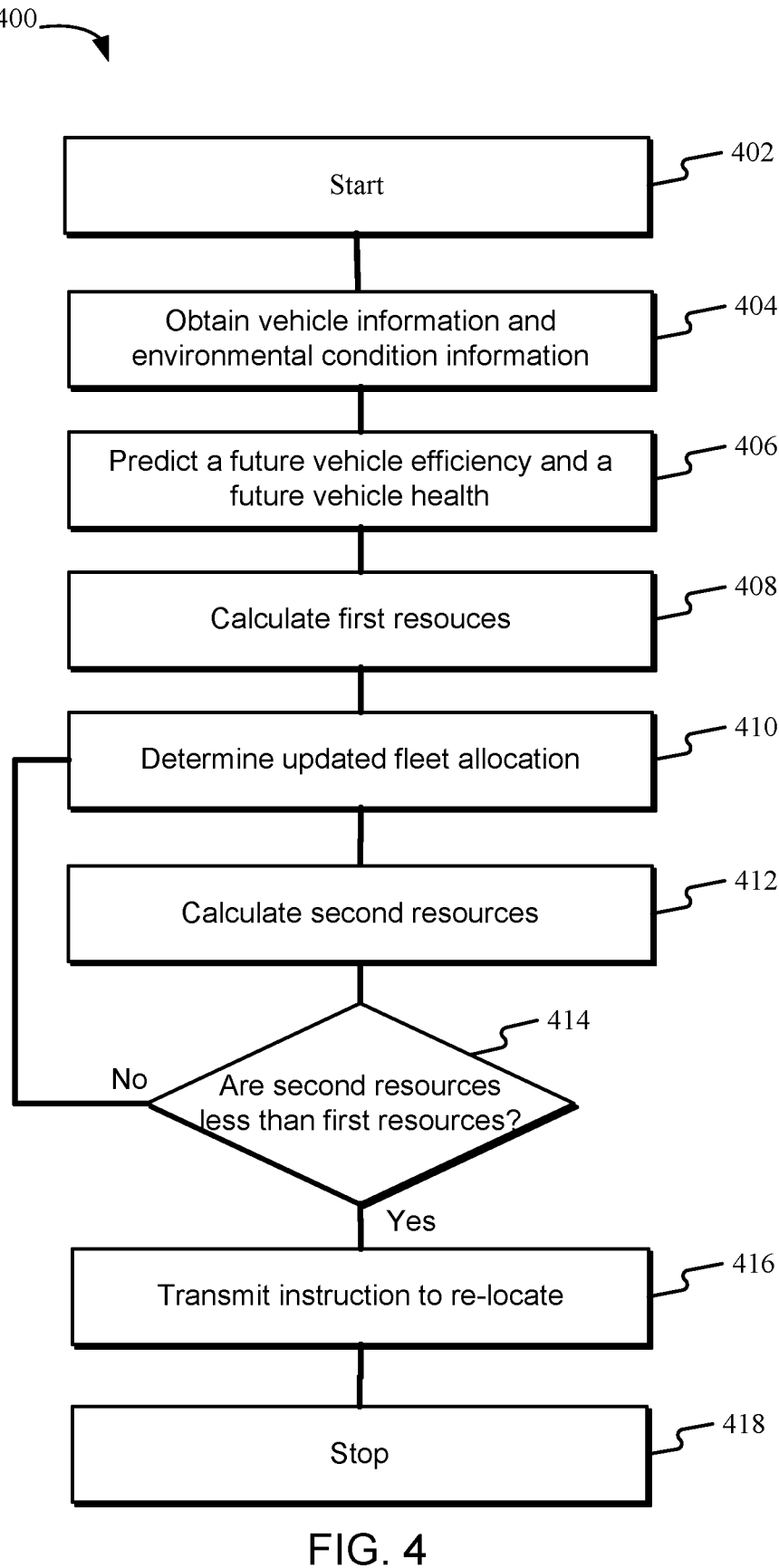
FIG. 4 depicts a flow diagram of an example fleet management method in accordance with the present disclosure.

FIG. 4 depicts a flow diagram of an example fleet management method 400 in accordance with the present disclosure. FIG. 4 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include obtaining, by the system processor 222, the vehicle information and the environmental condition information associated with each vehicle of a vehicle fleet. The details of the vehicle information and the environmental condition information are described above in conjunction with FIGS. 1 and 2. In some aspects, the system processor 222 may obtain such information at a first season end (or any time duration).

At step 406, the method 400 may include predicting, by the system processor 222, a vehicle future efficiency and a vehicle future health based on the obtained vehicle information and the environmental condition information, for example, in a second/upcoming season based on the current fleet allocation.

At step 408, the method 400 may include calculating, by the system processor 222, first resources (expenses) required to operate the vehicle fleet according to the current fleet allocation. The system processor 222 may calculate the first resources based on the prediction described in step 406. In some aspects, the system processor 222 may calculate individual vehicle scores based on the prediction, and the system processor 222 may calculate expenses required to operate individual vehicles according to the current allocation. The system processor 222 may aggregate the expenses associated with individual vehicles to calculate the first resources.

At step 410, the method 400 may include determining, by the system processor 222, an updated fleet allocation, as described above in conjunction with FIG. 2. At step 412, the method 400 may include calculating, by the system processor 222, second resources required to operate the vehicle fleet based on the updated fleet allocation. Specifically, the system processor 222 may predict future vehicle health and future vehicle efficiency in "re-allocated regions" based on the vehicle information and expected future climate condition in the "re-allocated regions", and calculate the second resources based on the predicted future vehicle health and the future vehicle efficiency in the "re-allocated regions". The second resources may include third resources required to relocate the vehicle fleet according to the updated fleet allocation.

At step 414, the method 400 may include determining whether the second resources are less than the first resources. Responsive to a determination that the second resources may be equal to or more than the first resources, the method 400 may move back to step 410 at which the system processor 222 may again determine the updated fleet allocation. In this manner, the step of determine the updated fleet allocation may be an iterative process and may be performed until the system processor 222 determines an updated fleet allocation that reduces the first resources.

On the other hand, responsive to a determination that the second resources may be less than the first resources at step 514, the method 400 may move to step 416. At step 416, the method 400 may include transmitting, by the system processor 222, an instruction to one or more vehicles to relocate according to the updated fleet allocation.

At step 418, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A fleet management system comprising:
a transceiver configured to:
    receive vehicle information from each vehicle of a vehicle fleet, wherein a first set of vehicles in the vehicle fleet are located in a first geographic region and a second set of vehicles of the vehicle fleet are located in a second geographic region; and
    receive, from each of the first set of vehicles, first environmental condition information of the first geographic region at an end of a first weather season; and
    receive, from each of the second set of vehicles, second environmental condition information of the second geographic region at an end of the first weather season;
a processor communicatively coupled to the transceiver;
    wherein the processor is configured to:
    predict a future vehicle efficiency and a future vehicle health of each vehicle based on the first environmental condition information, the second environmental condition information, and the vehicle information;
    calculate first future resources required to operate the vehicle fleet according to a current fleet allocation based on the future vehicle efficiency and the future vehicle health;
    determine an updated fleet allocation for the vehicle fleet;
    calculate second future resources required to operate the vehicle fleet according to the updated fleet allocation based on the first environmental condition information, the second environmental condition information, and the vehicle information;
    determine that the second future resources are less than the first future resources;
    transmit an instruction to at least one vehicle of the vehicle fleet to relocate based on the updated fleet allocation and the second future resources being less than the first future resources; and
    cause, in response to the instruction, the at least one vehicle to autonomously relocate from the first geographic region to the second geographic region.

2. The fleet management system of claim 1, wherein the vehicle information comprises information associated with vehicle efficiency, vehicle component health condition and vehicle type.

3. The fleet management system of claim 1, wherein the first environmental condition information comprises information associated with climate temperature and road conditions.

4. The fleet management system of claim 1, wherein the processor is further configured to:
    calculate third future resources required to relocate the at least one vehicle based on the updated fleet allocation; and
    calculate the second future resources based on the third future resources.

5. The fleet management system of claim 4, wherein the processor is further configured to provide a recommendation to replace a vehicle component of the at least one vehicle based on the future vehicle health and the third future resources required to relocate the at least one vehicle.

6. The fleet management system of claim 1, wherein the processor is further configured to:
    calculate a vehicle score for each vehicle according to the current fleet allocation based on the future vehicle efficiency and the future vehicle health at the end of the first weather season;
    correlate the vehicle score with an expense matrix;
    calculate a first expense to operate each vehicle according to the current fleet allocation in a second weather season based on the correlation; and
    calculate the first future resources required to operate the vehicle fleet based on the first expense of each vehicle.

7. The fleet management system of claim 6, wherein the processor is further configured to:
    calculate a regional score for each of the first geographic region and the second geographic region based on respective vehicle scores at the end of the first weather season;
    correlate the regional score with the expense matrix; and
    calculate a second expense to operate each regional fleet according to the current fleet allocation in the second weather season based on the correlation; and
    calculate the first future resources required to operate the vehicle fleet based on the second expense of each regional fleet.

8. The fleet management system of claim 1, wherein the second environmental condition information comprises current environmental condition information and expected future environmental condition information.

9. A method for fleet management comprising:
    obtaining, by a processor, vehicle information and environmental condition information associated with each vehicle in a vehicle fleet at an end of a first weather season, wherein a first set of vehicles of the vehicle fleet are located in a first geographic region and a second set of vehicles of the vehicle fleet are located in a second geographic region;
    predicting, by the processor, a future vehicle efficiency and a future vehicle health of each vehicle based on first environmental condition information associated with the first set of vehicles, second environmental condition information associated with the second set of vehicles, and the vehicle information;
    calculating, by the processor, first future resources required to operate the vehicle fleet according to a current fleet allocation based on the future vehicle efficiency and the future vehicle health;
    determining, by the processor, an updated fleet allocation for the vehicle fleet;
    calculating, by the processor, second future resources required to operate the vehicle fleet according to the updated fleet allocation based on the first environmental condition information, the second environmental condition information, and the vehicle information;

determining, by the processor, that second future resources are less than the first future resources;

transmitting, by the processor, an instruction to at least one vehicle of the vehicle fleet to re-locate based on the updated fleet allocation and the second future resources being less than the first future resources; and cause the at least one vehicle to autonomously relocate from the first geographic region to the second geographic region.

10. The method of claim 9, wherein the vehicle information comprises information associated with vehicle efficiency, vehicle component health condition, and vehicle type.

11. The method of claim 9, wherein the first and the second environmental condition information comprises information associated with climate temperature and road conditions.

12. The method of claim 9 further comprising:

calculating third future resources required to relocate the at least one vehicle based on the updated fleet allocation; and calculating the second future resources based on the third future resources.

13. The method of claim 12 further comprising providing recommendation to replace a vehicle component of the at least one vehicle based on the future vehicle health and the third future resources required to re-locate the at least one vehicle.

14. The method of claim 9 further comprising:

calculating a vehicle score for each vehicle according to the current fleet allocation based on the future vehicle efficiency and the future vehicle health at the end of the first weather season;

correlating the vehicle score with an expense matrix;

calculating a first expense to operate each vehicle according to the current fleet allocation in a second weather season based on the correlation; and calculating the first future resources required to operate the vehicle fleet based on the first expense of each vehicle.

15. The method of claim 14 further comprising:

calculating a regional score for each of the first geographic region and the second geographic region based on respective vehicle scores at the end of the first weather season;

correlating the regional score with the expense matrix at the end of the first weather season; and calculating a second expense to operate each regional fleet according to the current fleet allocation in the second weather season based on the correlation; and calculating the first future resources required to operate the vehicle fleet based on the second expense of each regional fleet.

16. A non-transitory computer-readable medium storing computer-executable instructions which when executed by one or more processors result in performing operations comprising:

obtain vehicle information and environmental condition information associated with each vehicle in a vehicle fleet at an end of a first weather season, wherein each vehicle is an autonomous vehicle;

predict a future vehicle efficiency and a future vehicle health of each vehicle based on respective environmental condition information and the vehicle information;

calculate first resources required to operate the vehicle fleet according to a current fleet allocation based on the future vehicle efficiency and the future vehicle health;

determine an updated fleet allocation for the vehicle fleet;

calculate second resources required to operate the vehicle fleet according to the updated fleet allocation based on the environmental condition information and the vehicle information;

determine that the second resources are less than the first resources;

transmit an instruction to at least vehicle of the vehicle fleet to re-locate based on the updated fleet allocation and the second resources being less than the first resources; and cause the at least one vehicle to autonomously relocate from a first geographic region to a second geographic region.

* * * * *